United States Patent
Sieling

(10) Patent No.: US 10,477,754 B2
(45) Date of Patent: Nov. 19, 2019

(54) IMPROVEMENTS FOR FOLDING AN AGRICULTURAL MACHINE

(71) Applicant: ROTACON ENGINEERING LIMITED, Onerahi (NZ)

(72) Inventor: Nicolaas Laurisse Sieling, Onerahi (NZ)

(73) Assignee: ROTACON ENGINEERING LIMITED, Onerahi (NZ)

( * ) Notice: Subject to any disclaimer, the term of this patent is extended or adjusted under 35 U.S.C. 154(b) by 0 days.

(21) Appl. No.: 15/513,289

(22) PCT Filed: Sep. 16, 2015

(86) PCT No.: PCT/NZ2015/050150
§ 371 (c)(1),
(2) Date: Mar. 22, 2017

(87) PCT Pub. No.: WO2016/048165
PCT Pub. Date: Mar. 31, 2016

(65) Prior Publication Data
US 2017/0295714 A1    Oct. 19, 2017

(30) Foreign Application Priority Data
Sep. 22, 2014 (NZ) ....................... 700270

(51) Int. Cl.
*A01B 73/00* (2006.01)
*A01B 73/06* (2006.01)
*A01B 59/04* (2006.01)

(52) U.S. Cl.
CPC ............ *A01B 73/005* (2013.01); *A01B 73/06* (2013.01); *A01B 59/04* (2013.01)

(58) Field of Classification Search
CPC ....... A01B 73/00; A01B 73/005; A01B 73/02; A01B 73/04; A01B 73/06; A01B 73/042;
(Continued)

(56) References Cited

U.S. PATENT DOCUMENTS 3,554,295 A * 1/1971 Kopaska ................ A01B 39/08
172/398
3,628,613 A * 12/1971 Kaufman ............... A01B 63/22
172/311
(Continued)

FOREIGN PATENT DOCUMENTS

| EP | 0956759 | 11/1999 |
|---|---|---|
| EP | 1859665 | 11/2007 |
| WO | WO 2013/135444 | 9/2013 |

OTHER PUBLICATIONS

International Search Report, PCT/NZ2015/050150, dated Jan. 11, 2016.

*Primary Examiner* — Robert E Pezzuto
*Assistant Examiner* — Adam J Behrens
(74) *Attorney, Agent, or Firm* — Young & Thompson

(57) ABSTRACT

An agricultural machine has a symmetrical chassis hydraulically transformable between a folded transport configuration and two unfolded configurations, using articulated beams. An air seeder example has a primary beam linking a tractor to a hopper-carrying trailer, also locating the chassis. Machinery such as seed openers is held in frames pivoted from the tertiary beams. In all configurations except completely folded, lateral chains that are maintained tight with a hydraulically powered tensioning system having sideways compliance maintain the tertiary beams and frame-supported machinery in a symmetrical configuration to each side of the primary beam, when working.

11 Claims, 5 Drawing Sheets

Figure 2:
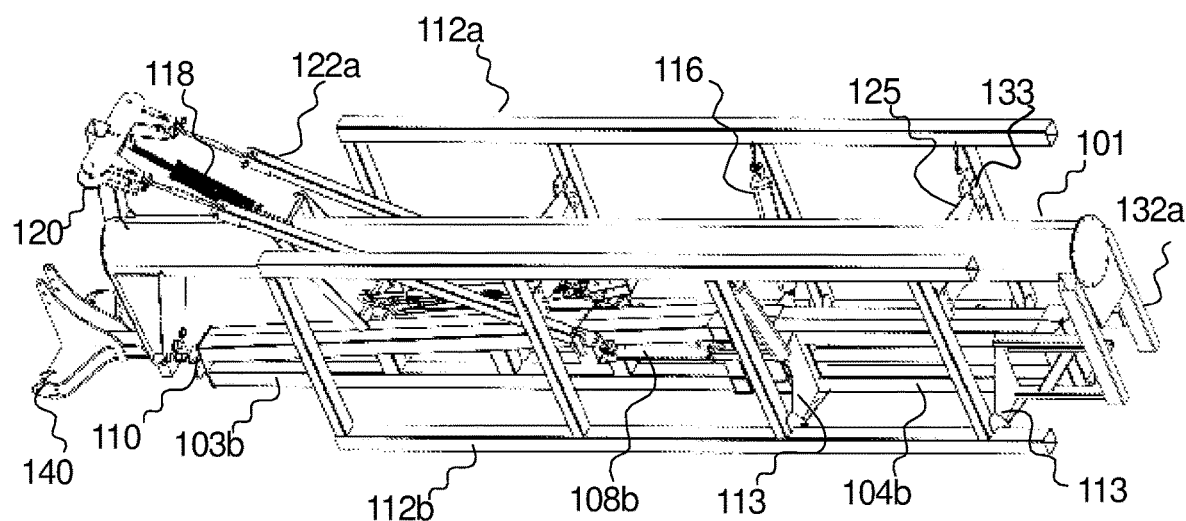

(58) Field of Classification Search
CPC ... A01B 73/044; A01B 73/046; A01B 73/062; A01B 73/065; A01B 73/067; A01B 59/04; A01B 49/04; A01B 15/14; A01B 19/04; A01B 19/06; A01B 23/04; A01B 43/005
See application file for complete search history.

(56) References Cited

U.S. PATENT DOCUMENTS

| | | | |
|---|---|---|---|
| 3,702,161 A * | 11/1972 | Zachary et al. | A01B 73/044 172/311 |
| 3,763,937 A * | 10/1973 | Nuckols | A01B 73/044 172/311 |
| 4,056,148 A * | 11/1977 | Blair | A01B 73/02 172/311 |
| 4,425,971 A * | 1/1984 | Allen | A01B 73/02 172/311 |
| 4,612,997 A | 9/1986 | Wilkins | |
| 5,806,606 A * | 9/1998 | Robinson | A01B 63/32 172/198 |
| 6,035,942 A * | 3/2000 | Smith | A01B 59/00 111/57 |
| 7,562,719 B1 | 7/2009 | Misenhelder et al. | |
| 8,626,408 B1 * | 1/2014 | Satzler | A01B 69/003 111/18 |
| 2007/0113764 A1 * | 5/2007 | Audette | A01B 73/044 111/170 |
| 2012/0247078 A1 * | 10/2012 | Landon | A01D 57/28 56/192 |
| 2013/0233580 A1 | 9/2013 | Kinzenbaw | |
| 2014/0311391 A1 * | 10/2014 | Audigie | A01B 63/22 111/70 |
| 2015/0020492 A1 * | 1/2015 | Schwer | A01B 63/24 56/377 |
| 2016/0029539 A1 * | 2/2016 | Aho | A01B 43/005 171/44 |

* cited by examiner

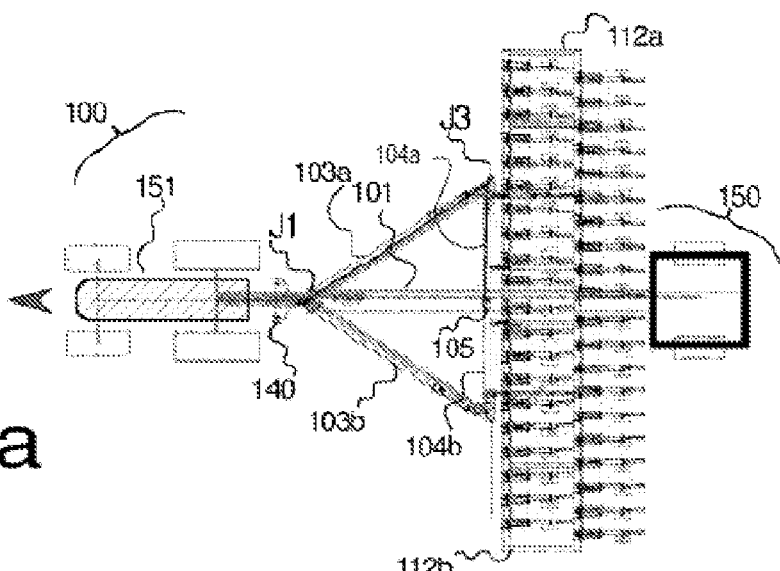
Fig 1a
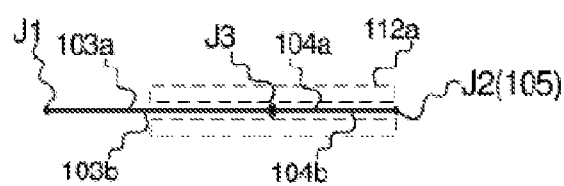
Fig 1b
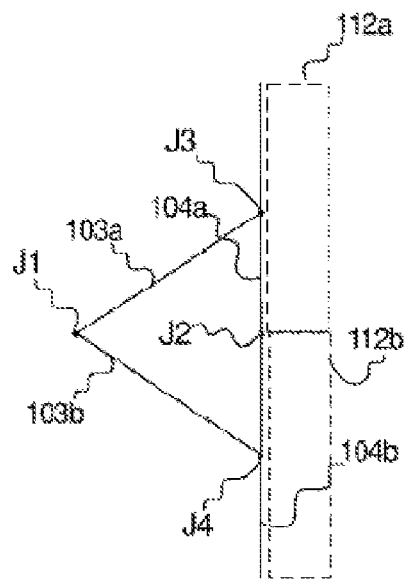
Fig 1c
Fig 1d

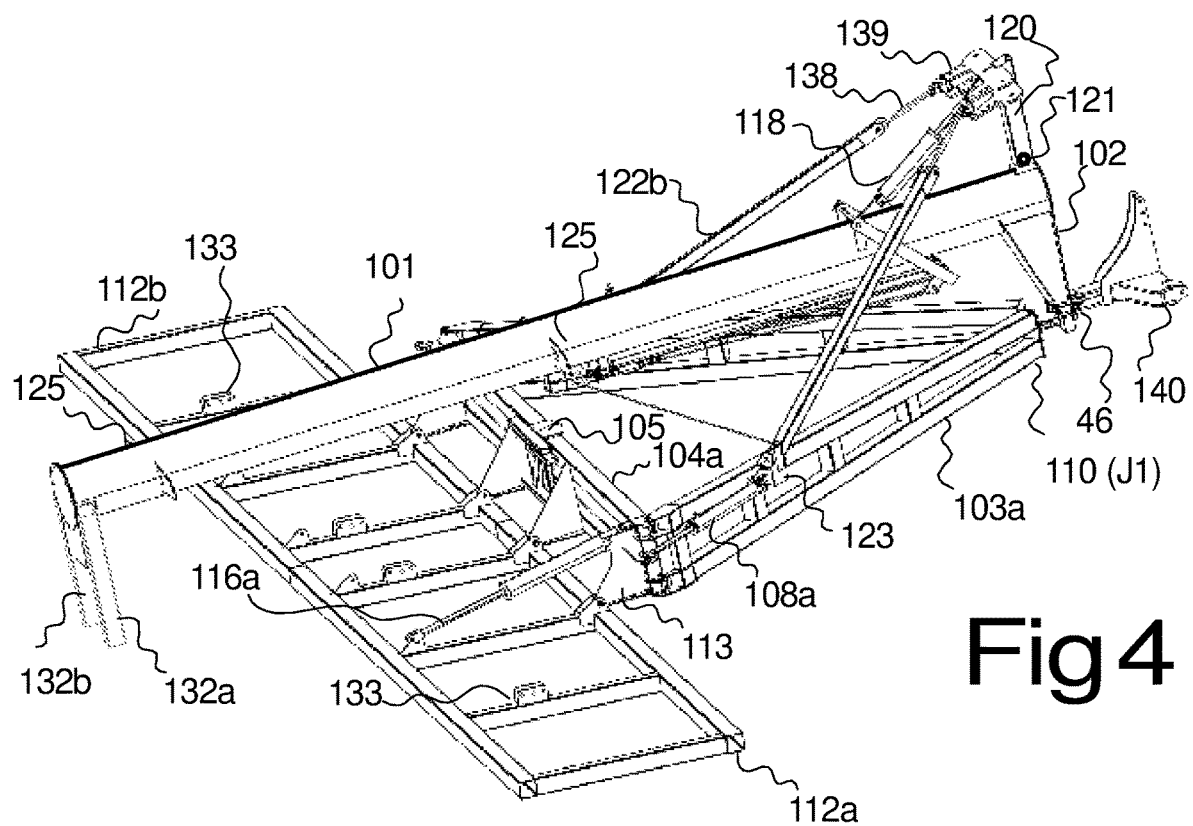
Fig 4
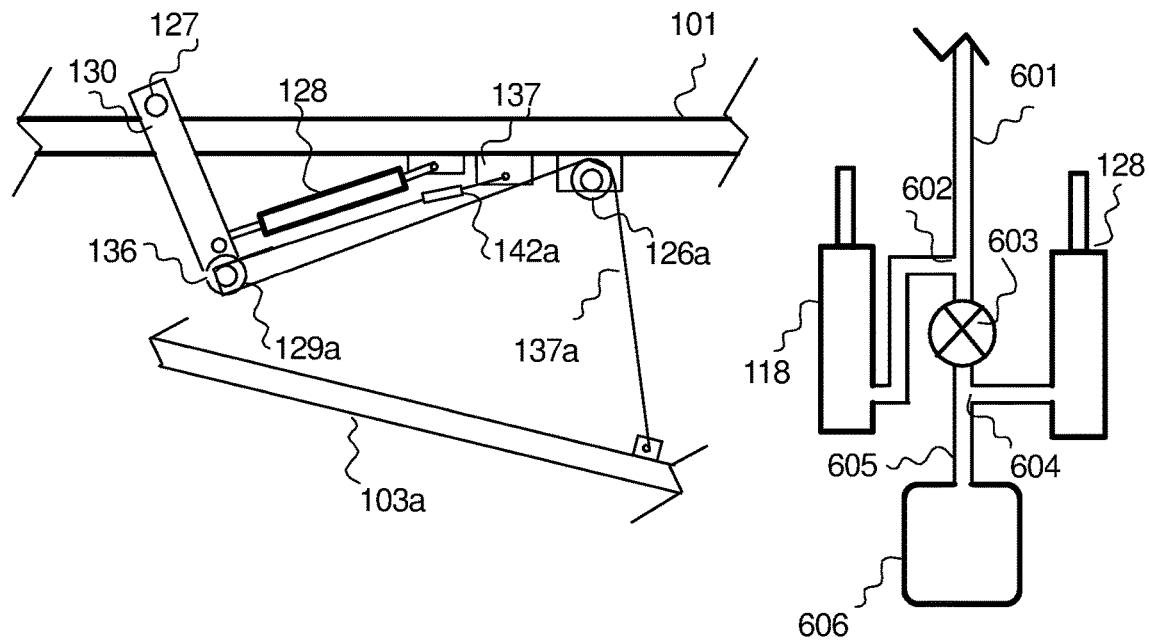
Fig 6b
Fig 6c

IMPROVEMENTS FOR FOLDING AN AGRICULTURAL MACHINE

FIELD

This invention relates to means or arrangements to facilitate operation and transportation of agricultural machines; in particular wide, towed machines; the means including a reversibly foldable chassis to reduce overall width for endwise transportation and including means to actively maintain a symmetrical configuration.

Definitions

The term actuator as used herein refers to a powered ram, usually a hydraulically driven ram and sometimes a reversible ram having connections at one or both ends to a controlling supply of hydraulic fluid under pressure. Pneumatic or electrically driven rams or electrically driven winches are options.

An unfolded, lowered (or first) configuration means a configuration in which the agricultural machinery is spread laterally and can perform its allotted task, such as (but without limitation) sowing seeds upon or within a soil surface. In this unfolded configuration selected agricultural equipment is supported on the soil surface while working.

A raised (or second) unfolded configuration comprises an uplifted or disengaged mode.

A transport (or third) folded configuration means a configuration in which the agricultural machinery having changed shape is able to fit through farm gates (3-5 meters wide) and will comply with public road transport regulations in relation to width and height upon a public road, so that the equipment can be taken from one site to another without escort.

CROSS-REFERENCES

The Applicant has concurrent patent applications having a common priority date, locatable by inventor name SIELING, Nicolaas Laurisse. This specification details several mutually interdependent innovations in relation to seeders.

BACKGROUND

The inventor has developed a number of improvements to agricultural machinery of the particular type known as an "air seeder" which is intended to be towed behind a sufficiently powerful tractor across a field, sowing perhaps 20-40 rows in each pass to meet optimised parameters such as seed spacing, seed depth, fertiliser depth, and fertiliser amount. The configurational problems described in the next section may affect other machinery.

Problem to be Solved

One problem faced by crop farmers is that when in a working or unfolded configuration the available agricultural machinery intended for seeding a field is too wide at typically more than 12 meters width to travel along a road, or to pass through a farm gate.

Clearly, agricultural machinery that is to be towed behind or pushed in front of a tractor or other prime mover should operate in an unfolded or working configuration that covers as much of a field as possible in each pass, in order to maximise productivity of the operator and the device. But, unless the same equipment can be easily and reversibly transformed into a changed shape—the transport configuration—that is narrow along the axis of the direction of motion, in order to move through a farm gate from one field to another or to move freely along a road from one farm to another, the equipment is compromised. A solution to the problem would be reliable, easily put into effect, and should not require more than one person to carry out the operation. Further, a transformable chassis should also allow the equipment to be either lowered onto a surface of a field or raised from the surface such as when turning around—which is a different configuration change than the change between unfolded and folded configurations.

A particular problem is that the equipment at nominally 6 tonnes (for one constructed prototype) is heavy and could overbalance especially if in a folded configuration or if, when spread wide for working and then lifted above the ground and disturbed, the trailer (150) is all that is providing stability. For that reason, actively maintaining symmetry is useful.

Another problem is that when in use forces may arise that cause misalignment of the machine along an intended path. For that reason also, actively maintaining symmetry is useful.

Object

An object of the present application is to provide improvements to agricultural machinery; to ways to change the configuration of crop sowing machinery including but not limited to air seeders between a wide or unfolded configuration and a narrow or folded transport or storage configuration without disrupting a weight and shape symmetry, or at least to provide the public with a useful choice. Another object is to allow the equipment when in an unfolded configuration to be either lowered onto a surface of a field or raised from the surface such as when turning around. A third object is to add improvements that maintain precise alignment of the machinery behind the tractor unless an excessive sideways deflecting force is applied.

SUMMARY OF INVENTION

In a first broad aspect the invention provides an agricultural machine (100) to be drawn over a soil surface in a field or from place to place by a prime mover (151); the machine having a hinged frame or chassis carrying machinery support frames that are used to support selected agricultural equipment; the machine having at any time one of three configurations; wherein the agricultural machine has a raised median longitudinal beam or primary beam (101) extending between a hitching point (140) to which point the prime mover (151) is reversibly connected by a pivoted connection, and a rear trailer (150); the beam (101) defining a median line of symmetry; in a first lowered and unfolded configuration, extended perpendicular to the median line, (FIG. 1a, FIG. 3), the weight of the chassis is supported through the selected agricultural equipment from the soil surface; in a second raised and unfolded configuration again extended perpendicular to the median line, two struts (122a, 122b) serve to support the weight of the chassis from the beam (101); in a third, folded, transport configuration (FIG. 1b, FIG. 2), the chassis and frames and the agricultural equipment supported thereupon are folded into a narrow, vertical shape elongated along the median line and supported from the beam (101); and the agricultural equipment is supported by machinery support frames (112a, 112b) pivotally linked to the chassis; the chassis being actively maintained in a symmetrical configuration with respect to beam (101) within and during a transition between any of the configurations using two laterally directed centering chains (137a, 137b) provided with common hydraulically powered tension control means to the beam (101).

Preferably, when in the third configuration the chassis is capable of being reversibly attachable between the frames (112a, 112b) to the primary beam (101) by a series of securable fasteners, comprising brackets (133) and hooks (125) thereby maintaining the configuration during transport.

In a related aspect, the chassis includes a paired set of secondary beams (103a, 103b) sharing maintained pivotal connections at a median joint (J1) connected with the hitching point (140) and a paired set of tertiary beams (104a, 104b) sharing maintained pivotal connections with each other at a joint (J2); the secondary beam (103a) being pivotally joined to tertiary beam (104a) at joint (J3) and the secondary beam (103b) being pivotally joined to tertiary beam (104b) at joint (J4), wherein tertiary beam (104a) pivotally supports an edge of adjacent machinery support frame (112a), and tertiary beam (104b) pivotally supports an edge of adjacent machinery support frame (112b); said machinery support frames being supported on a plurality of pivot joints (113) and tiltable by reversible actuators (116a, 116b) along a horizontally inclined axis between a horizontal position (FIG. 3) when in either the first or second unfolded configuration and a vertical position (FIG. 2) when in the folded configuration.

In one option, tertiary beam (104a) extends from median joint (J2) wherein tertiary beam (104a) extends from median joint (J2) beyond joint (J3) for a distance, and pivotally supports an edge of adjacent machinery support frame (112a), and tertiary beam (104b) extends from median joint (J2) as far as joint (J4) and pivotally supports an adjacent part of an edge of adjacent machinery support frame (112b).

In another option, tertiary beam (104a) extends from median joint (J2) as far as joint (J3) and pivotally supports an adjacent part of an edge of adjacent machinery support frame (112a), and tertiary beam (104b) extends from median joint (J2) as far as joint (J4) and pivotally supports an adjacent part of an edge of adjacent machinery support frame (112b).

Preferably the tertiary beams (104a, 104b) include torsion tubes (137) fixed lengthwise within each of the tertiary beams.

In a further aspect, at least one of the joints (J1, J2, J3 and J4) is provided with a reversible hydraulically powered actuator capable, when in use, of changing the joint angle and forcing the chassis to undergo a transition between the third configuration wherein the adjoining secondary and tertiary beams are maintained at a first angle of about 180 degrees (FIG. 1b) at joints (J3, J4); or forcing the two joints (J3) and (J4) into a second, acute, controlled angle having the effect that the joint (J2) assumes an angle of 180 degrees (FIG. 1d, FIG. 6a) when the agricultural machine enters the second configuration, wherein the laterally directed centering chains (137a, 137b) always maintain symmetry.

Preferably, an opposite pair of the joints (J3 and J4) are each provided with a reversible powered actuator capable, when in use, of forcing both joints into either a first controlled angle for the third configuration wherein the adjoining secondary and tertiary beams are maintained at a first angle of about 180 degrees (FIG. 1b); or forcing the two joints (J3) and (J4) into a second, acute, controlled angle having the effect that the joint (J2) assumes an angle of 180 degrees (FIG. 1d, FIG. 6a) when the agricultural machine is in either the first or the second unfolded configuration, and wherein the laterally directed centering chains (137a, 137b) are active and maintain symmetry.

In a further aspect, the hitching point (140) is surmounted by a buttress maintaining the primary beam (101) in a raised position at a leading end and supporting a pivotable mast (120), while a trailing end of said primary beam (101) is securely connected at a raised position to the trailer (150).

In a related aspect, the machine provides actuator means comprising actuator/ram (118) capable when extended against the mast (120) of, by means of struts (122a, 122b) lifting the frames up and out of the restraining means that are used during transport; namely the series of brackets (133) and the set of hooks (125) upon the primary beam.

Preferably, means capable when in use of raising or lowering the machinery support frames (112a, 112b) above a soil surface when reversibly changing between the second raised configuration and the first lowered configuration comprises the actuator/ram (118) connected between the primary beam (101) and the pivotally mounted mast (120); wherein, when in use, a forward motion of the top of the mast caused by extension of ram (118) applies tension on to the pair of struts (122a, 122b) and thereby raises the agricultural equipment machinery above the soil surface by means of a lifting motion applied to the secondary beams (103a, 103b) and transmitted to the tertiary beams (104a, 104b) and hence to the machinery support frames (112a, 112b).

Preferably the machine includes hydraulic control means allowing an operator accompanying the prime mover to carry out the following steps having the effect of reversibly converting the machine from the third folded or transport configuration to the first and unfolded configuration (having first manually removed all retaining pins from restraining brackets (125)):

1. applying an extending force to hydraulic actuator (118) to lift the frames and the attached equipment until brackets on the frames are freed from the hooks (125);
2. applying an extending force to reversible hydraulic actuators (116a, 116b) until the machinery support frames supported from the tertiary beams have been lowered and are aligned in a horizontal plane;
3. then of causing extension of each of two reversible hydraulic actuators (108a, 108b) thereby causing the joints (J3, J4) to change the respective joint angle from a 180 degrees (straight) configuration into an acute angle, thereby forcing the joint (J2) to adopt a 180 degrees (straight) configuration; until the pivoted second ends of the tertiary beams become locked by locking means when sharing substantially the same axis,
4. and removing pressure from ram (118) to lower the applicators on to the ground surface—at which point the applicators are not supported vertically by beam (101).

and performing the steps in reverse order to convert the machine back into the third, folded configuration.

In a yet further aspect, the reversible transition of the chassis between the first and the second unfolded configuration, and between the second configuration and the third folded configuration continuously maintains the symmetrical configuration of the chassis with reference to the primary beam (101) through action of an active chain tensioning apparatus having two tension-carrying chains (137a, 137b) both anchored at a first end along the primary beam and each anchored at a second end located upon each secondary beams (103a, 103b) wherein both tension-carrying chains (137a, 137b) pass through a system of pulleys including pulleys (126a, 126b) mounted upon the primary beam (101), then along the median line to pulleys (129a, 129b) anchored to pivotable stirrup (130) mounted upon the primary beam (101) against which stirrup a predetermined force is maintained, when in use, by a pressurized actuator (128) mounted upon the primary beam (101) thereby imposing a total or summed predetermined tension within both chains; a bight of reserve chain comprised of the two chains beneath the primary beam (101) being terminated at chain anchors (137) close to pulleys (126a, 126b); thereby, when in use, actively maintaining the machinery support frames (112a, 122b) of the chassis in symmetry with respect to the primary beam (101) within any of the three configurations, and during each transition between the configurations.

In a related aspect the system capable of maintaining an upper limit of a summed tension in both chains (137a, 137b) includes the pressurized actuator (128) pivotally mounted from beam (101) and positioned in order to push the stirrup (130) with a predetermined force includes the actuator (128) which is selected in accordance with a desired amount of force to be developed, given a known working hydraulic fluid pressure applied at the input (604) to the actuator, and in accordance with stroke length; the input (604) to the actuator being maintained at the working fluid pressure maintained in a hydraulic line which is provided with a safety valve activated in event of the pressure inside the actuator (128) being raised beyond a limit by an excessive sideways force applied to the chassis and passed to the actuator through either chain (137a, 137b) from the machinery support frames (112a, 112b); in which case, release of a length of chain from the bight of chain maintained in a state of tension by the system of biased pulleys occurs, thereby providing sideways compliance to the means maintaining a symmetrical centered configuration.

Preferably, the system for maintaining the hydraulic input (604) to the actuator at the known working hydraulic fluid pressure provides the pressure from within a hydraulic accumulator (606) having been loaded with a delivered pressure maintained by a feed through a cross relief valve (603) from a hydraulic line (601) shared by the extending side of actuator (118) connected to the mast (120); said cross relief valve (603) serving as a safety valve to release an excess in the working fluid pressure and of releasing hydraulic fluid into line (601) in that event.

In a still further aspect, controlled location of primary beam (101) between the tractor (151) and the trailer (150) in combination with the continuously active centering system is capable, when in use, of providing a high placement accuracy of better than half a spacing between two rows, for inter-row sowing.

PREFERRED EMBODIMENT

The description of the invention to be provided herein is given purely by way of example and is not to be taken in any way as limiting the scope or extent of the invention. In particular the dimensions as described are purely illustrative of one air-seeder embodiment. It is to be understood that the terminology which has been used is intended to be in the nature of words of description rather than of limitation.

In this specification, reference numerals, including reference numerals appearing in the Summary of Invention, are provided for clarification only and are not intended to restrict the scope of the invention to the particular embodiments of the components in conjunction with which the reference numerals are used.

Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps. Each document, reference, patent application or patent cited in this text is expressly incorporated herein in their entirety by reference. Reference to cited material or information cited in the text should not be understood as a concession that the material or information was part of the common general knowledge or was known in New Zealand or in any other country.

DRAWINGS

FIG. 1a. Orientation plan drawing of a complete air seeder in the unfolded configuration.

FIGS. 1b (folded), 1c (during change), and 1d (working). Plan diagrams showing three steps of the change of configuration of the two pivoted pairs of beams.

FIG. 2. Oblique view of the two frames of the air seeder in the fully folded position.

Figure 3:
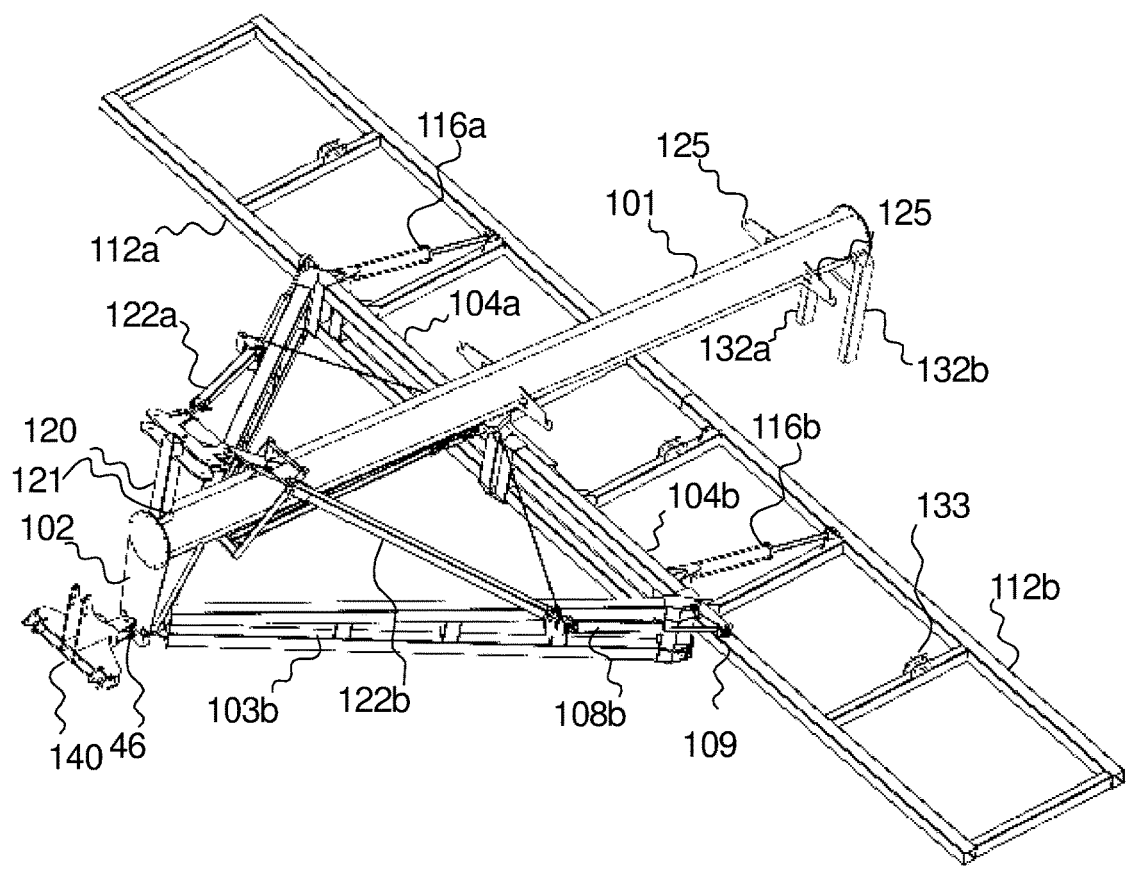

FIG. 3. Oblique view showing the beam arrangements in the unfolded position.

FIG. 4. Another oblique view showing the beam arrangements in the unfolded configuration.

Figure 5A:
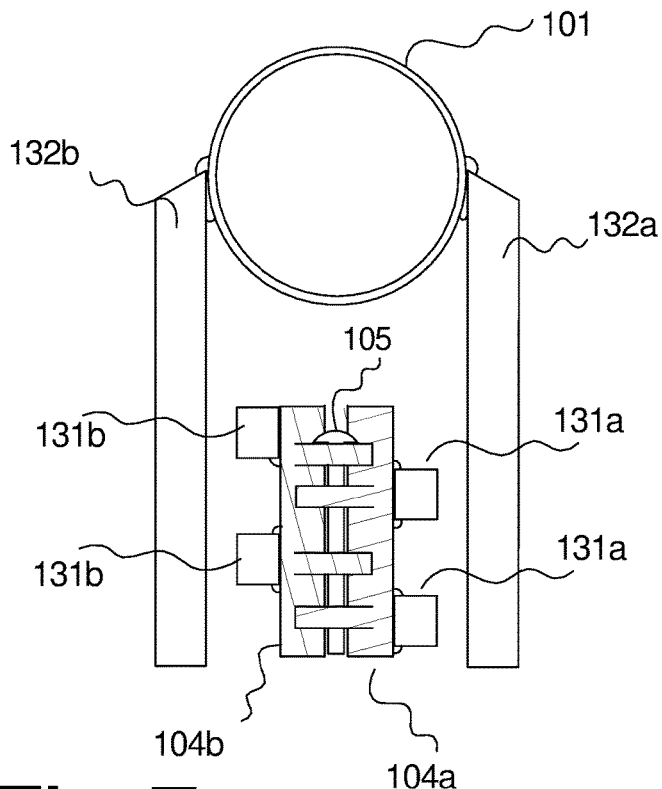

FIG. 5a. End rear diagram showing bars welded to the tertiary beams restrained under the trailing end of the main beam (101) when beams (104a, 104b) are in the folded configuration.

Figure 5B:
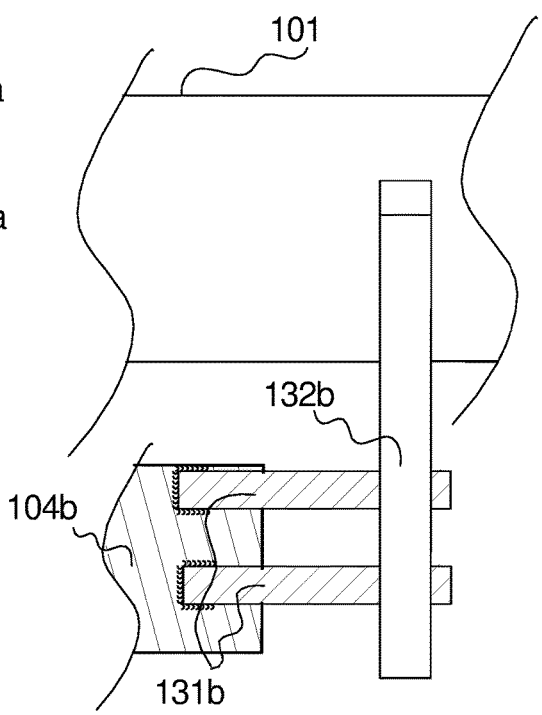

FIG. 5b. Side view of parts shown in FIG. 5a.

Figure 5C:
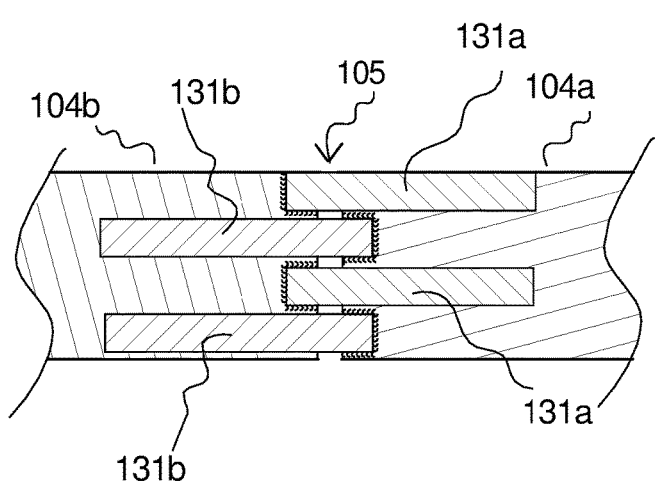

FIG. 5c. End rear diagram of area of pivot between beams (104a, 104b) showing the bars welded to the tertiary beams when in the unfolded configuration.

Figure 6A:
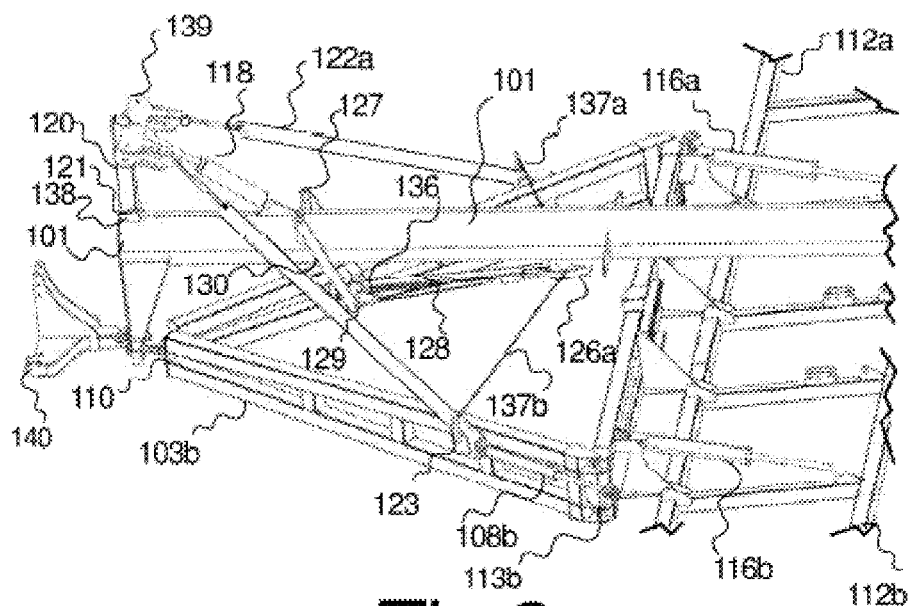

FIG. 6a. Oblique side view to show the position of the means for maintaining balance and symmetry FIG. 6b. Schematic diagram of the chain or rope layout used for maintaining balance and symmetry.

FIG. 6c. Schematic diagram of the hydraulic circuit used for maintaining chain tension and symmetrical placement of the beams and frames under normal working conditions.

Figure 7:
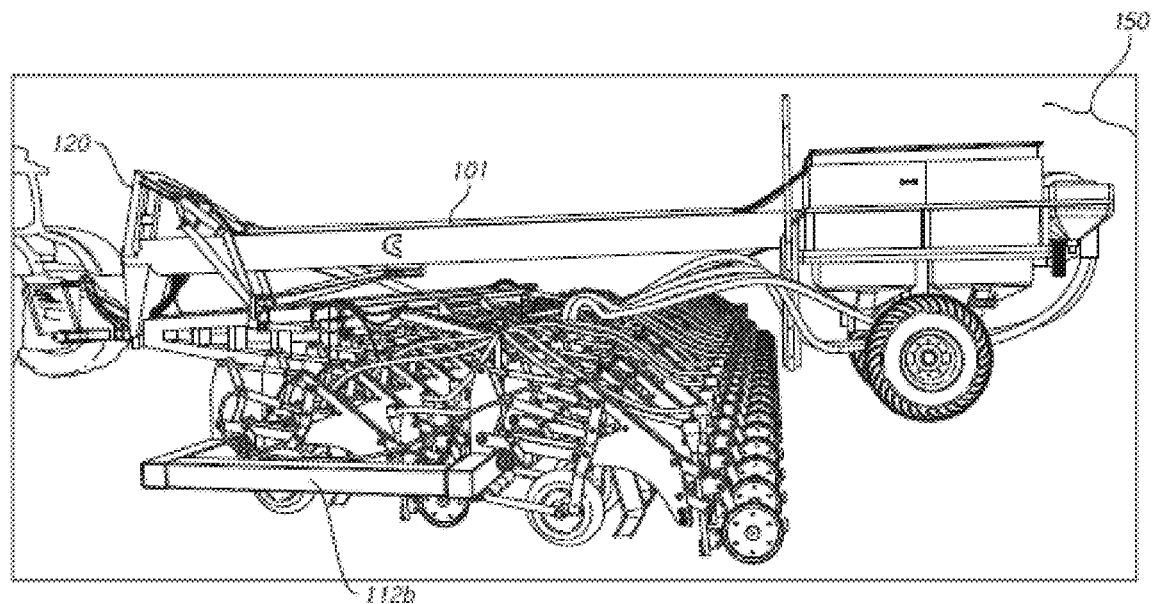

FIG. 7. Oblique view comprising a photograph showing the openers—seed equipment—mounted upon the folding chassis according to the invention.

Related to appreciation of the Figures is a Youtube video which shows the agricultural machine "Rotacon RA40" in use; in both the working (unfolded) configuration and in the folded (transport) configurations. See https://www.youtube.com/watch?v=FBPbtyuxy4 which was downloaded on 10:09:2015.

INTRODUCTION

A chassis of an agricultural machine (an air-seeder for sowing wheat or other seeds) capable of undergoing a shape transformation process is described. It has three configurations. In either a first lowered and unfolded configuration or a second raised and also unfolded configuration, the machine is a (for example 12 meters) wide agricultural machine capable of sowing perhaps 40 individual rows of seeds at one pass (as in FIGS. 1a, 1d, 3 and 4). In a third, folded or transport configuration, the chassis and machine has a narrow but long shape (as in FIG. 1a and FIG. 2), less than 3 meters wide and 4 meters high, suitable for unescorted road transport or for passing through farm gates. Configuration changes can be achieved by the operator from the cab of the tractor using hydraulic rams. The chassis of the agricultural machine transiently but while retaining full strength and maintaining weight balance passes through the diamond shape of FIG. 1c while changing between the linear FIG. 1b shape of the third configuration and the second, raised configuration. It is unlikely that the machine would change directly between the first, lowered configuration and the third transport configuration.

Shape configuration between folded and unfolded forms is changed with two symmetrically placed double acting rams (108), acting across the pivots (joints J3,J4) between beams (103a, 104a) and between beams (103b, 104b). The machinery support frames are rotated by hydraulic actuators (116a, 116b) about an edge shared with the tertiary beams (104a, 104b) into a vertical orientation for transport or rotated into a horizontal orientation, parallel to the soil surface, for use, as the first or lowered, unfolded configuration. For turning the air-seeder around at the end of a row a ram (118) positioned to push the mast forward is extended causing the agricultural equipment on the frames previously in the unfolded and lowered configuration to be lifted off the ground—so entering the second unfolded, raised configuration. The chassis beneath the primary beam (101) is not vertically supported from beam (101) when in the agricultural machine is in the first lowered and unfolded configuration, although that beam is used by a system including chains (137a, 137b) in tension to be described below, to tug the chassis from side to side, and maintain the chassis in a symmetrical position in relation to the fore-and-aft line of beam (101). In the first configuration the weight of the chassis is carried on the soil surface. But, when in the second raised and unfolded configuration, beam (101) supports the chassis through two struts placed in tension; also from the pivot (J1) by the hitch point. Centration to maintain symmetry of the chassis is continuously imposed by the chains (137a, 137b) in tension including during a reversible transition of the chassis between the first unfolded configuration and the second unfolded configuration, and between the second unfolded configuration and the third folded configuration.

Example 1

With reference to FIG. 1a, the triangular assembly of beams and the attached frames and agricultural equipment is strongly attached pivot point (J1) beside the drawbar and hitch point.

The drawings show the chassis (100) and frames (112a and 112b) that are used to support the individual seeding applicators but for clarity the applicators themselves are shown only in FIG. 1a. There will be pipes to convey supplies from hoppers in the rigidly attached trailer assembly (150) to the individual seeding applicators. Nor are hydraulic hoses to the rams shown, for simplicity. The trailer assembly or unit (150) with wheels and hoppers is shown in FIG. 1 and the photograph, FIG. 7. The chassis includes a drawbar (140) shown at the left in FIG. 2 for coupling the chassis to a prime mover and includes support means (150) representing a fixed trailer unit including wheels, carrying hoppers for materials such as different kinds of seeds and fertilisers to be used. That trailer assembly (150) supports the machine via primary bar (101) in relation to the surface of the field when in use or above a road when being transported. The invention is maintained in symmetry on each side of a central axis, and duplicated parts at right or left sides may be identified herein as a or b according to side they are on.

The invention refers to an air seeder as the example agricultural machine. The invention may be appreciated as a chassis for supporting a large number of individual air seeder openers. In the first or second configuration (FIGS. 1a, 1d, 3 and 4) the chassis is unfolded into a (for example) 12 meters wide, horizontally oriented active or working configuration. When in either unfolded configuration the chassis provides a transversely extended array of frames (112a, 112b) supporting applicators (not shown, having their own ground contact means). Particularly in the unfolded configurations a system of chains in tension maintain the chassis in symmetry each side of beam (101). In the third configuration (FIG. 1b, FIG. 2 and FIG. 5) the chassis exists as a long, narrow, vertical, compact and inactive shape suitable for transport. The parts are locked in place by fasteners on to brackets, for continued support if hydraulic pressure is lost.

The median primary beam (101) is preferably made of tubular steel and does not change shape. In this invention the mid-part of beam (101) does not provide lifting support for the frames (112a, 112b) when in the first, lowered and unfolded configuration although it does provide lift from the leading end in the second, raised and unfolded configuration. The frames are deliberately fastened on to the sides of beam (101) at holding means (133/125) (see FIG. 5) when the frames are in the third configuration.

The primary beam (101) extends from a raised and buttressed flange (102) adjacent the coupling (140) to run along the full length of the chassis and be locked to the trailer unit. Under the front end of the primary beam and in line horizontally with the coupling means (140) a symmetrical pair of secondary beams (103a, 103b) is pivotally attached to the coupling means with the pivot axis in a vertical or near-vertical axis, side by side, by their front ends. Each secondary beam such as (103b) in FIG. 2 or FIG. 3 is comprised of a vertically separated pair of box-section steel tubes, welded together by short sections, in order to confer suitable stiffness on the secondary beams. Each of the secondary beams is able to swing out to the side of the primary beam (101) as a result of action of hydraulic cylinders (108a, 108b) when the chassis is in either unfolded configuration as shown in FIGS. 1a, 1d, 3 and 4.

During folding or unfolding the secondary and tertiary beams momentarily pass through a quadrilateral shape as shown in FIG. 1c. The beams always retain their strength for supporting the weights of both the frames (112) and the sets of applicators attached to the frames (112) throughout the transition, thanks to the inherent strength of the articulations or pivot points.

Each secondary beam is supported at a block (123) along its length by a weight-bearing strut (122a), or (122b). The struts are in tension during unfolding and when the frames are deliberately lifted for the second raised and unfolded configuration using ram (118). The two struts are adjustable in length with turnbuckles (138) to provide sufficient "slack" or play in struts (122) in order to render them non-effectual while the machine is in the first lowered and unfolded configuration. The leading end of each strut is connected by a shackle passed through one of a series of holes or attachment points in plate (139) that is welded on to a mast (120) extending up from the front end of the primary beam (101). (It should be noted that the mast and pivot as drawn in FIG. 3 may not be sufficiently robust for extremes of torque during use on uneven fields. A different version (120, 139) is shown in FIG. 7). The attachment points are spaced either side of the centre line of the beam (101), so that struts (122) do not collide with primary beam (101). Ram (118) is attached at one end on to pivot point (119) on top of beam (101). The other end of ram (118) is pivotally attached near the top of a nearly vertical mast (120) pivoted at its base point (121) to the top of primary beam (101). The ram (118) allows both frames (112a, 112b) to be raised or lowered on to the soil surface together from the tractor cab, hence changing the configuration from second (ram extended) to first (ram withdrawn) configurations. The ram forces the angle of inclination of the mast to change. A quick transition is useful, for example, when turning around at the end of a field, to avoid dragging the working components of the seeder or other equipment through the ground.

Each strut support block (123) on beam (103a, 103b) is conveniently also a base for one bidirectional hydraulic ram (108a, 108b) that is pivotally connected to a short arm fixed onto an adjacent end of an adjacent tertiary beam (104a, 104b) on the far side of a joint between the two beams. The double acting rams (108a, 108b) force the joint between the secondary beams (103a, 103b) and tertiary beams to pivot on a substantially vertical axis. These rams force the change in support beams between the narrow, folded configuration as shown in FIG. 1b and FIG. 2 in which the joints (J3) and (J4) are at an angle of 180 degrees, with the beams (103a, 103b) and (104a, 104b) in a straight line, to an acute joint angle at (J3 and J4) for either unfolded configuration as shown in FIGS. 1a, 1d, 3 and 4.

FIG. 4 in particular shows that each of the two tertiary beams (104a, 104b) which are joined together at pivot joint (105), having a vertical axis, provides two pivotable supports (113) for one of the two machinery support frames (112a, 112b), at their inward halves. Beams (104a, 104b) are comprised of two box-section steel tubes and include a lengthwise torsion bar or tube (137) between and parallel to the tubes. The torsion tubes help to ensure that the twisting load resulting from frames (112) does not deform beam (104). The outward halves of the frames are sufficiently rigid to maintain their positions during use, even during the process of raising or lowering the frames and when in the folded configuration. The pivotable supports (113) allow the frames (112a, 112b) and the machinery they carry to be moved from a vertical transport position to a horizontal working or unfolded position simply by extension of double acting hydraulic rams (116a, 116b)—and back to the folded or transport configuration when the rams (116a, 116b) are retracted. Preferably, rams 116a, 116b are placed close to the joints (J3) and (J4).

One option for the tertiary beams (104a, 104b), which are relatively rigid, is that their lengths extend only between joint (J3) and joint (J2) or between joint (J4) and joint (J2). Another option is that the articulation at joint (J4) and joint (J3) with corresponding beams (103a, 103b) is placed at about a middle position along the tertiary beams (104a, 104b), as shown in FIG. 1d so that the tertiary beams are extended beyond the pivot points (J4) and (J3) along the entire length of the adjacent frame (112a) or frame (112b). This variation adds strength to the lateral ends of the frames, since the frames receive many forces when working, and the tertiary beams are made strong including torsion bars. For example, each of the 40 openers carried on the air seeder machine exerts about 150 kg pressure on the ground by virtue of its own weight and a share of the weight of the chassis of the machine when in the FIRST lowered and unfolded configuration, while drag of the tines and the coulter through the ground comprise large applied forces.

When in the first configuration the chassis and the frames are supported by the components including (for instance) wheels on each opener and they receive no vertical support from beam (101). To move to the folded position or to turn the machine at the end of the field, the load comprising the weight of the frames and the applicators carried on the frames is transferred to beam (101) and the frame or buttress at (102) via mast (120) so that the openers are lifted above the soil surface, which is a condition of the second raised and unfolded configuration.

FIGS. 3 and 4 also show that the median or inner ends of the machinery support frames (112a, 112b) become aligned in end-to-end contact across a central opening in the array of frames when rams (108) are extended. There need be no missing rows of planted seed (for example) when the machinery is in use. A particular advantage of this invention is that when in the unfolded configuration the secondary and the tertiary beams form an approximately equilateral triangle having an apex under the front end of the primary beam (101), two sides (103a, 103b), and a base (104a) joined to (104b) and also connected to the machinery support frames (112a, 112b) thereby providing the agricultural machinery with a strong connection to the pivot (110) adjacent drawbar (140) while being drawn over a field and carrying out an operation involving significant and varying force such as dragging seed tines and fertiliser tines through the topsoil of the field. In support of this strong shape, the adjacent ends of the tertiary beams are positively prevented from pivoting beyond a straight line by end-to-end contact between the median parts of frames (112a, 112b).

TABLE 1

| Configuration: | Narrow (folded or transport) | Wide (unfolded) and wide (working) |
| --- | --- | --- |
| Dimensions (approx) | Long (about 10 meters), narrow, vertical shape less than 3 meters wide and 4 meters high. | 12 meters (typically) wide. Length of beam 101 (hitch point to trailer) is unchanged. |

Unfolding Process:
1. Starting in the third folded or transport configuration, the operator uses ram (118) and struts (122a, 122b) to lift frames (112a, 112b) out of the restraining hooks, after restraining means such as pins (134) that have been manually placed for security during transport are first removed.
2. Hydraulic rams (116a, 116b) which are supported from beams (104a, 104b) are extended so that the frames (112a, 112b), pivotally mounted on a number of brackets (113) fixed to the rear edge of beams (104a, 104b) move from a vertical transport position to a horizontal working position. That is an early step to ensure that frames (112) do not collide with primary beam (101), which would happen if they remained vertical. Preferably motion of the two rams (116a, 116b) is synchronised by operator skills or better, by use of synchronised hydraulic means so that the machine retains balance and does not tip.
3. Note that from the commencement of this stage the chain centering system is active. Then, as in FIGS. 1b and 2, rams (108a and b) are extended. As a result the inside angle between each of the pairs of beams (103a and 104a; 103b and 104b), is reduced from 180 degrees (straight) and the angle between beams (104) at median pivot point (105 or J2) increases from its fully folded attitude of 0 degrees to 180 degrees. Preferably motion of the two rams (108a and 108b), like all movements of pairs of rams, is synchronised by hydraulic means although the chain centering system serves to maintain symmetry.

4. When the angle between beams (104) at pivot point (105) has reached the working position of 180 degrees (straight line) a stop prevents further movement. The stop preferably comprises the inside or medial ends of the rear members of frame (112) coming into contact with each other. Now, the two tertiary beams (104a, 104b) become locked in line with each other and beams (103a, 103b) form a triangular shape with beams (104a, 104b). Now the machine is in the second raised and unfolded configuration.

5. Ram (118) is withdrawn when in the first lowered and unfolded configuration, so that the secondary and tertiary beams are lowered and the openers on the frames make contact with, and are supported by the soil surface.

Folding Process:

The folding operation, starting typically from the second raised and unfolded configuration, is:

1) Extend ram (118) until the openers and their associated ground contact parts are off the ground.
2) Retract rams (108a, 108b) until the two sets of beams (103a and 103b), and (104a and 104b) are parallel and close together.
3) Retract rams (116a, 116b) until the frame (112) is substantially vertical and each of a set of pins (124) attached to a bracket (133) on frame (112) is above a corresponding hook (125) attached to beam (101. In this case hook (125) is an upwardly directed 'U' shaped cut-out on a metal sheet including sloped lead-in sides welded to beam (101); four examples being shown in FIG. 3.
4) Depressurise ram (118), lowering frame (112), until each bracket (133) is aligned with hook (125) on beam (101). The primary beam (101) has, welded along its length, a corresponding number—such as 4—of hook-like fins (125) (see FIG. 3), each of which extends a notched upper edge (as shown at top right of FIG. 3). After the fins (125) and the brackets (133) have become engaged, the folding components and working mechanisms are supported. In the folded configuration shown in FIG. 2, a fin (125) engaged with a bracket (133) is shown at upper right; pin 134 is not in place.
5) Once the fins (125) with their hooks and the brackets (133) have engaged, the chain centering system is no longer effective.
6) It is advisable that the operator inserts pins (134) (not shown) through holes (135) in brackets (133)—see FIG. 4 to maintain the brackets in place on the hooks (125—FIG. 4). Now the frames (112) cannot be lifted out (or jolted out) until after removal of each pin (134). Pins (134) also prevents accidental unfolding or lowering of frames (112). The machine is now ready for transport.

Note that the trailing end of the primary beam (101) and a share of the weight applied to the beam when in the second raised and unfolded configuration or in the third folded or transport configuration such as by raised frames is always supported by the wheeled trailer (150), always attached at the trailing end of the beam (101). In either unfolded configuration, as in FIGS. 3 and 4 the inner ends of the rear members of frames (112a, 112b) rest against each other and provide a stop to further extension of rams (108a, 108b). Positive engagement means, such as a pin and eye arrangement to maintain position are an example of an option to maintain alignment between the inner ends of the frames during use. For instance one frame may have a "v" welded on the inside rear end and the other frame has a corresponding locating notch.

FIGS. 5a, 5b and 5c illustrate apparatus for confining the frames on beams (104a, 104b) at joint (J2) when the chassis is in the folded configuration. The trailing end of primary beam (101) is shown in a rear view diagram in FIG. 5a during the folded configuration. One downwardly projecting bar (132a, 132b) (of a material such as box section steel) each about 0.5 meter long are welded to each side of beam (101) close to its trailing end. Joint (J2) between the tertiary beams, when folded into the folded configuration, moves backward while remaining in a medial line under primary bar (101). Then, bars (132a, 132b) particularly confine the rearwardly projecting arms (131a) welded to (104a) and (131b) welded to (104b) which extend between the bars (132) as shown in the side view, FIG. 5b (where only bars (131b) are drawn). Each pair is fixed to beams (104a) and (104b) on one side as shown in FIG. 5c. When the machine is in either unfolded configuration, beams (104a, 104b) are in a straight line and the arms, two of which are vertically offset, lie across the joint as shown in FIG. 5c. In these configurations arms 131 are far removed from bars (132a) and (132b). But, when the machine is in the folded configuration and beams (104a) and (104b) are folded so as to lie parallel, the arms extend in a trailing direction back from the joint as shown in FIGS. 5a and 5b. The folded chassis is restricted from moving beyond the limits imposed by contact between the (131) set and the (132) set of beams. This arrangement helps prevents the folded machine tipping sideways when it is in a tall shape with a narrow wheelbase—that of the trailer (150) especially before the machinery support frames (112a, 112b) have been secured on the hooks (125) attached to beam (101). It should be noted that lifting the frames (112a, 112b) by the ram (118) on to the set of hooks (133) upon the primary beam (101) ready for securing in place by insertion of pins (134) would be a difficult task without hydraulic assistance since each frame may weigh two tonnes.

Stability and Centering

With reference to FIG. 1a and when in either of the unfolded configurations, the triangular assembly of secondary and tertiary beams with attached frames and agricultural equipment is pivotally attached to the primary beam (101) near the hitch point (140) close to pivot point (J1). A hydraulic chain tensioning apparatus and chains (137a, 137b) to be described below assists in maintaining symmetrical positioning of the beams (103a, 103b) with respect to the axis of the primary beam (101) and serves to prevent the assembly from swinging from side to side. The chains are also in effect when the chassis is in the second configuration, because for instance turning at an end of a field tends to make the chassis swing out. (In fact the chain tensioning apparatus remains effective until the chassis has become completely folded). Primary beam (101) is held between the tractor (151) and the trailing hopper (150). A particular advantage of centering the working elements and forcing them to lie symmetrically beneath the long main beam (101) is that all the working components will very precisely follow the tractor to enable accurate "between row" sowing with the aid of GPS steering technology as is well known in the agricultural industry. The track followed by the machine is controlled to a precision of better than half a between-row space. At the same time this aspect of the invention provides a working component protection system so that the total sideways force on these components cannot exceed 2000 kg f.

The chain tensioning apparatus has a defined maximum holding force of (in the prototype example) 2000 kg f (kilograms force) and will give way thus exhibiting sideways compliance if excessive tension is applied to the chains—which may occur during use, such as when manoeuvring around obstacles, or during use on uneven ground. Refer to FIG. 6b on sheet ⅗, illustrating the following with particular reference to the "a" side. The portion of the chain (137a) between a chain anchor attached along the secondary beam (103a) at a point near the rear pivot points (J3, J4) or at about where the struts (122) are pivotally attached, and pulley (126a) attached to beam (101) is laterally extended while the remainder of the chain is in a vertical plane typically located underneath the primary beam (101). The laterally extended part applies the centering tension of (when summed together) 2000 kg f to the secondary beams, while the part of the chain between pulley (126a) and turnbuckle (142a) serves as a bight of spare chain to be paid out or pulled back during action of the chain tensioning apparatus. Alternatives to chain (137a and 137b) include any strong, flexible, inextensible cord such as wire rope or non-metallic rope.

Each chain passes around a pulley (126a) fixed to beam (101) at a point preferably located at a similar distance from pivot point (110/J1) as the distance between pivot point (110/J1) to the attachment of the strut (122a) at (123a) on beam (103a). Each chain then leads forward and around another pulley (129) mounted at point (136) at the bottom of a stirrup assembly (130). (The other chain (137b) is provided with independent pulleys 126b and 129b). The stirrup is hinged at pivot point (127) on beam (101). The chain is taken back to a fixed point (137) at or near pulley (126). Turnbuckle (142a) allows chain length trimming to attain good alignment. This arrangement is mirrored on the other side with separate pulleys and turnbuckle.

An example of a preferred hydraulic mechanism for maintaining the pressure in a centering ram (128) is described in relation to the schematic diagram in FIG. 6c. A selected hydraulic ram (128), preferably a single acting displacement ram, is pivotally mounted at one end to beam (101) near to the pulley (126b) position and at the other end is pivotally mounted onto the stirrup (130) which holds pulleys (129). This arrangement of pulleys including some movable pulleys comprises a novel way to provide a bight of spare chain from which chain may be paid out or recovered while remaining under tension, keeping the agricultural machine in a symmetrical configuration in any configuration.

(Numerical values given here are by way of example only). Ram (128) is plumbed, as shown in FIG. 6c into the hydraulic line for extending the mast lift ram (118) and is provided with a substantially constant pressure as will be explained below. Note that ram (128) is in practice longer than as shown in the diagram, since it should be able to swivel the stirrup over a useful span. As a functional equivalent, ram (128) could be placed on the other side of strut (130) and operated in order to pull on the strut and the pulleys (129). Ram (128) is selected so that, when pressurised to 180 bar and in relation to leverage along the stirrup assembly (130). The sum of the tensions in the two chains is maintained at 2000 kg f, which is sufficient to keep the working components of the agricultural machine in a symmetrical position to each side of beam (101). If the chain on one side becomes loose because the corresponding secondary beam had moved closer to the centre line (perhaps because the field has a slope) then maintained pressure of the ram (128) on the stirrup assembly (130) applies a larger proportion of the total tension on the tight chain (on the other side) causing that other side to move back toward the centre line until the loose chain has been tightened again, when the machine is again symmetrically centred under beam (101). With this aspect of the invention, both chains are only equally tight when the agricultural machine is stationary and on level ground. For example, if it was on a slope then the downhill chain might have a tension of 1500 kg f and the uphill chain only 500 kg f, but the total is maintained at 2000 kg f and the working components are still centered.

Sideways compliance arises because the maximum pressure inside ram (128) is limited as described below with reference to FIG. 6c. Too much tension in the chain is reflected back into the ram.

The ram (118) is vented (not shown) at the end closer to the mast (120) back to the hydraulic fluid tank. When the operator causes a frame lifting action through ram (118) and mast (120) such as to enter the second raised unfolded configuration, the opened hydraulic line (601) from the tractor forces hydraulic fluid through a "T" fitting (602) with one leg of the "T" going to the bottom end of lift ram (118). The other leg of the "T" goes through a cross relief valve (603), which is set at 180 bar, to a second "T" fitting (604). One leg of fitting (604) goes to the centering ram (128) and the other leg is connected through pipe (605) to a pre-charged hydraulic accumulator (606) which maintains the pressure in ram (128) over time. The cross relief valve is a two port valve which opens when pressure at either port exceeds 180 bar.

A preferred hydraulic mechanism allows for that centering force to be exceeded from time to time without damage, as "sideways compliance", whereas a metal chain is inextensible. The working components will be allowed to temporarily move off-centre relative to beam (101) since the ram (128) is supplied with a constant pressure. If the agricultural machine's frames are subjected to a displacing force exceeding (within the chains) a total of 2000 kg f then the centering ram will be shortened a small amount by chain tension and the pressure in the centering ram (128) linked to the accumulator (606) will tend to increase above 180 bar Like a safety valve, the cross relief valve will then allow some hydraulic fluid to bleed back to lift ram (118) and pressure will be reduced to 180 bar and the working components allowed to go slightly off-centre. When the machine "straightens up" the accumulator will allow hydraulic fluid to flow back to the centering ram (128) which continues to apply a predetermined force to stirrup (130) and through pulleys (129a, 129b) again centering the working components. The pressure in the accumulator (606) and the centering ram (128) is reduced slightly. The equipment supported on frames (116a, 116b) moves back into the centre under beam (101).

Each time the agricultural machine's frames (112a, 112b) are lifted by the operator, such as for a headland turn or for folding the pressure on the lift ram side of the cross relief valve (in 601) is raised to approximately 190 bar as required to lift the machine. At this time the cross relief valve (603) opens and hydraulic fluid flows in order to increase the pressure in the accumulator (606) and centering ram (128) to 190 bar. When the machine is lowered to the ground while in the unfolded configuration (or into restraining hooks when being folded for transport) hydraulic fluid bleeds back through the cross relief valve until the pressure in the accumulator (606), in line (605), and inside the centering ram (128) is lowered to 180 bar. Pressure lost by alignment returning actions will be restored at the next headland turn when the components are lifted by applying pressure through line (601) into ram (118) and putting an initial 190 bar pressure back into the system.

The agricultural machine's folding and unfolding procedure is modified accordingly. Lifting ram (118) is plumbed through a cross-relief valve to the centering ram (128). The first operation in the folding process is to lift the working components clear of the ground by increasing pressure in lift ram (118), in this case to around 190 bar. The pressure in lift ram (118) is transmitted to the centering ram (128) throughout the folding process as per the diagram of FIG. 6c. As beams (103a, 103b) move closer together during the folding up operation the centering chains are kept tight by ram (128) which extends in doing so. As ram (128) extends it draws hydraulic fluid from lift ram (118) and the folding components and working components are lowered slightly. Conversely, during the unfolding operation the centering ram (128) contracts as beams (103) move away from the centre line and the chains tighten. The hydraulic fluid displaced by this contraction is fed back to ram (118) under the piston which raises the folding and working components slightly, and a small volume of hydraulic fluid is displaced from above the piston back to the hydraulic tank.

It is possible that if ram (118) is fully extended during the unfolding operation then the hydraulic fluid displaced by the contraction of centering ram (128) will have nowhere to go and the pressure in the system will increase. In case that happens, a pressure relief valve (not shown) that is set at 230 bar; above the pressure that can be supplied by the tractor is used to return fluid back to a reservoir tank.

In a modified version, ram (118) is operated independently and a separate circuit supplies the centering ram (128) with a pressure relief valve bleeding any over-pressure back to the tank. In another modified version the centering ram (128) retains the accumulator (606) in line and includes a pressure relief valve, but a pressure sensor (not shown) opens a pressure supply valve each time the pressure drops below a set value. In an option it is possible to have a single short chain (or rope) fixed to beam (101) at or near (126). The chain (or rope) leads to a single pulley on the stirrup (130) at point (136). After the pulley at (136) the chain (or rope) then is shackled to the two equal length chains or ropes which go through the individual pulleys at (126) and then out to their respective beams (103).

In another example of the machine the pivot point (105) or (J2) between tertiary beams (104) can be constructed with "twisting play" so that the two frames (112) may follow ground contours independently of each other. It is likely that this option would be used in a wider version of the machine. These improvements are intended to let the frames carrying the seeder openers (if that is the kind of machine in use) trail behind the tractor while seeking a minimum drag, as facilitated by sideways compliance provided within the ground-contacting components of every opener, as described in a co-pending application.

During any occasion when it is desired to drive the tractor in a curve (to avoid an obstacle for example), while the implement is in the first lowered and unfolded configuration and hence in contact with the soil surface, the ground contact components (such as coulter, tines, support wheels and press wheel) of the openers will be subject to sideways forces as they move (centered under beam 101) around the curve. As described above, the centering mechanism will allow the machinery support frames themselves to move sideways to lower the forces on the ground contact components if the total load on them exceeds as predetermined amount. If this total load continues to exceed the predetermined amount then the frames will be allowed to go further off—centre, (limited only by the length of the stroke of the centering ram (an unlikely event in operation))

The Applicant's co-filed applications describe how sideways compliance for the various parts is put into effect; further, that the amount of sideways force may be different at different openers or along different parts of a machinery support frame at any one opener. The co-filed patent describes how any individual opener (and components within each opener) can react to sideways forces. Striking an obstacle like a stone while carrying out a planting curve markedly compounds the problem and one or more opener components may need to move sideways in addition to the protection provided by the centering system breakout or sideways compliance.

Advantages

Advantages of this machine include a lowered risk of tipping over when not supported by wheels of the devices in the frames.

A simpler process for changing configurations is provided that uses fewer hydraulic rams and fewer hydraulic circuits.

When the machine is in either unfolded configuration, the frames supporting the agricultural machinery (such as openers) closely track motion of the prime mover or tractor, being restrained by the chain system, and stay within a space defined by motion of the primary beam between the tractor at one end and the trailer that carries the hoppers. Tension generated by the hydraulic means for maintaining chain tension may be overcome by a transient overload arising from a forced sideways displacement, but is restored. When the frames are raised in order to turn a circle at the end of a pass and the machine enters the second and raised unfolded configuration, the frames remain restrained in terms of side-to-side movement, and stay in line with beam (101).

Competing machines (floating hitch or rigid hitch) do not have the sideways compliance of this invention and offer no protection to the supported machinery in terms of forces causing sideways movements of the machinery support frames. They rely on extremely heavy construction to limit damage.

When the frames are lowered, in the first lowered and unfolded configuration, the working components are not dependent for vertical support from beam (101) and are able to follow the ground surface independently of the tractor and the following trailer The same folding and unfolding principle can be applied to machines other than air seeders.

The tiltable mast design with a single actuator allows quicker lifting and lowering.

Availability of the folding and unfolding process, including lifting and lowering of the machinery support frames provides minimised width dimensions for the folded configuration, so that the machine can be towed at a reasonable speed along a road and through farm gates, and be stored conveniently. The invention overcomes some countries' regulations requiring an escort.

Machines having even wider working shapes can be transformed into the same height and width when folded, although they will be longer.

Finally it will be understood that the scope of this invention as described and/or illustrated herein is not limited to the specified embodiments. Those of skill will appreciate that various modifications, additions, known equivalents, and substitutions are possible without departing from the scope and spirit of the invention as set forth in the following claims.

I claim:

1. An agricultural machine configured to be drawn over a soil surface in a field or from place to place by a prime mover, the machine comprising:
   a frame or chassis carrying machinery support frames that are used to support selected agricultural equipment; and
   a raised primary beam extending from a hitching point to which the prime mover is reversibly connected by a pivoted connection, to a rear trailer, the primary beam defining a median line of symmetry for the frame or chassis,
   wherein the frame or chassis includes four beams connect together by four joints, each of the joints being pivotable about a separate vertical axis of rotation,
   wherein the beams of the frame or chassis include a first secondary beam and a second secondary beam pivotally connected to each other and to the primary beam at a first one of the joints at a first end of each of the first secondary beam and second secondary beam,
   the first secondary beam is pivotally connected at a second end by a second one of the joints along a first tertiary beam,
   the second secondary beam is pivotally connected at a second end by the third one of the joints along a second tertiary beam,
   a first end of the first tertiary beam is connected at a fourth one of the joints to a first end of the second tertiary beam,
   the first tertiary beam is extended beyond the second joint along the entire length of a first machinery support frame and the second tertiary beam being extended beyond the third joint along the entire length of a second machinery support frame, and
   the agricultural equipment is pivotally connected to the first machinery support frame and to the second machinery support frame.

2. The agricultural machine as claimed in claim 1, wherein the frame or chassis is able, when in use, of being reversibly configured,
   wherein
   a. in a first configuration in which the chassis is lowered and unfolded and the first and second tertiary beams are extended perpendicular to the primary beam, the weight of the chassis is supported through the agricultural equipment from the soil surface,
   b. in a second configuration in which the chassis is raised and unfolded and extended perpendicular to the median line, a first strut is pivotally connected between a pivotable mast and the first secondary beam, and a second strut is pivotally connected between the pivotable mast and the second secondary beam supports the weight of the chassis, or
   c. in a third configuration in which the chassis is folded for transport, the chassis and machinery support frames and the agricultural equipment supported thereupon are folded into a narrow, vertical shape elongated along the median line and supported from the primary beam by reversible attachments.

3. The agricultural machine as claimed in claim 2, wherein, when in the third configuration, the chassis is configured to be reversibly fastenable by a series of securable fasteners comprising brackets and hooks holding the machinery support frames to the primary beam thereby maintaining the configuration during transport.

4. The agricultural machine as claimed in claim 2, wherein the machinery support frames are supported from the tertiary beams on a plurality of pivot joints and are tiltable by reversible actuators along a horizontally-inclined axis between a horizontal position, when in either the first or second unfolded configuration, and a vertical position, when in the folded configuration.

5. The agricultural machine as claimed in claim 2, wherein at least one of the joints of the frame or chassis is provided with a reversible hydraulically-powered actuator configured, when in use, to force the frame or chassis to undergo a change of shape between the third configuration in which the adjoining secondary and tertiary beams are maintained substantially parallel, or to force the first and second tertiary beams to assume a common axis perpendicular to the primary beam when the agricultural machine enters the first configuration.

6. The agricultural machine as claimed in claim 5, wherein the joint between the adjoining first secondary and first tertiary beams, and the joint between the adjoining second secondary and second tertiary beams are each provided with a reversible actuator configured, when in use, to change an angle between the respective first secondary and first tertiary and the second secondary and second tertiary beams at the joint.

7. The agricultural machine as claimed in claim 1, wherein the hitching point is surmounted by a buttress maintaining a leading end of the primary beam in a raised position, the buttress supporting the pivotable mast, while a trailing end of said primary beam is connected at a raised position to the trailer.

8. The agricultural machine as claimed in claim 7, wherein an actuator or a ram configured, when in use, to erect the pivotable mast thereby applying tension on to the first and the second struts, is used, when in the third configuration, to lift the machinery support frames up and out of a restraining system used during transport, and is used, when in the first configuration, to lift the first and second machinery support frames upward and thereby lift the agricultural equipment above the soil surface.

9. The agricultural machine as claimed in claim 1, wherein the symmetrical configuration of the chassis with reference to the primary beam is maintained by two chains, a first one of the chains being anchored at a first end along the primary beam and being anchored at a second end upon the first secondary beam, and a second one of the chains being anchored at a first end by a chain anchor along the primary beam and being anchored at a second end upon the second secondary beam, both of the first and second chains passing over a system of pulleys including a pair of first pulleys mounted upon the primary beam, then along the median line to a pair of second pulleys anchored along a pivotable stirrup mounted upon the primary beam against which stirrup a predetermined force is actively maintained, when in use, by a pressurized actuator pivotally mounted from the primary beam thereby imposing a total or summed predetermined tension within both of the first and second chains, a bight of reserve chain maintained in a state of tension by the system of pulleys is comprised of the first and second chains beneath the primary beam terminated at the chain anchor close to the first pair of pulleys, thereby maintaining the machinery support frames of the chassis in symmetry with respect to the primary beam,
   wherein the pressurized actuator is maintained at a pressure and includes a safety valve activated by excessive sideways force applied to the chassis and passed to the actuator through either of the first and second chains, to result in release of a length of chain from the bight of chains, thereby providing sideways compliance to the agricultural machine.

10. The agricultural machine as claimed in claim 9, further comprising a system for maintaining the hydraulic input to the actuator at a working hydraulic fluid pressure provides the pressure from within a hydraulic accumulator loaded with a delivered pressure and maintained by a feed through a cross-relief valve from a hydraulic line, the cross-relief valve serving as a safety valve configured, when activated by an excess in the working fluid pressure, to release hydraulic fluid into the hydraulic line.

11. The agricultural machine as claimed in claim 9, wherein the frame or chassis is actively maintained at all times when in use in a symmetrical configuration with respect to the primary beam by tension within a first laterally-directed centering chain between the primary beam and the first secondary beam, and within a second laterally-directed centering chain between the primary beam and the second secondary beam, thereby providing a high placement accuracy of better than half a spacing between two rows for inter-row sowing.

\* \* \* \* \*